United States Patent [19]

Steinberg

[11] Patent Number: 4,855,747

[45] Date of Patent: Aug. 8, 1989

[54] METHOD OF TARGET IMAGING AND IDENTIFICATION

[75] Inventor: Bernard D. Steinberg, Wyndmoor, Pa.

[73] Assignee: Trustees of the University of Pennsylvania, Philadelphia, Pa.

[21] Appl. No.: 86,695

[22] Filed: Aug. 17, 1987

[51] Int. Cl.⁴ .............................................. G01S 13/90
[52] U.S. Cl. ..................................... 342/179; 342/25; 342/194
[58] Field of Search ................. 342/25, 179, 176, 194, 342/55, 56, 59, 368–377

[56] References Cited

U.S. PATENT DOCUMENTS

| 4,219,811 | 8/1980 | Herman et al. |
|---|---|---|
| 4,450,444 | 5/1984 | Wehner et al. |
| 4,527,161 | 7/1985 | Wehner |
| 4,546,355 | 10/1985 | Boles |
| 4,562,439 | 12/1985 | Peralta et al. |
| 4,611,208 | 9/1986 | Kane et al. |
| 4,616,227 | 10/1986 | Homma et al. ........................ 342/25 |
| 4,686,532 | 8/1987 | McAulay ............................. 342/195 |
| 4,717,916 | 1/1988 | Adams et al. ........................ 342/107 |
| 4,720,712 | 1/1988 | Brookner et al. .................... 342/383 |
| 4,723,124 | 2/1988 | Boles ..................................... 342/25 |

Primary Examiner—Thomas H. Tarcza
Assistant Examiner—John B. Sotomayor
Attorney, Agent, or Firm—Woodcock Washburn Kurtz Mackiewicz & Norris

[57] ABSTRACT

A method of high resolution imaging and identifying of targets with an Inverse Synthetic Aperture RADAR (ISAR) coupled with Adaptive Beam Forming (ABF) is disclosed. The ISAR system utilizes a pulsed RADAR transmitter and a highly thinned, dispersed phased array with random, non-colinear elements. An adaptive processor and feedback loop performs the ABF process such that high resolution of a moving target is possible. The high resolution signal allows accurate imaging and identification of the moving target.

4 Claims, 3 Drawing Sheets

METHOD OF TARGET IMAGING AND IDENTIFICATION

This invention relates to high resolution imaging of airborne and other targets. Furthermore, this invention is directed to techniques which provide high resolution images for identification purposes of airborne targets with erratic flight paths.

BACKGROUND OF THE INVENTION

Radio detection and ranging (RADAR) has been known since the Second World War. This technique comprises illuminating a target with electromagnetic radiation an receiving backscattered signals from the target at a receiver. From the phase and amplitude information contained in the backscattered signal the target's characteristics can be determined. Due to the nature of electromagnetic propagation and the distances involved from the receiver transmitter set to the target, the resolution of received images has generally been of low quality.

In order to improve the resolution of the images, RADAR transmitter sets have developed with an eye toward increasing the aperture size. With large apertures sizes and wavelengths in the microwave region, the wavelength to aperture size ratio is small enough so that the degree of resolution is within a few radians. Typically, the resolution for wavelengths in the optical region is between $10^{-4}$ to $10^{-5}$ radians. However, to achieve the same degree of resolution for wavelengths in the microwave region it would be necessary to have aperture sizes between 100 meters and 30 kilometers.

One way of overcoming the problem of attaining large aperture sizes in microwave imaging systems is to utilize a phased array. Phased arrays are well known in the RADAR art. They are usually distributed randomly or in a pre-determined pattern such that the properties of the backscattered radiation can be described only statistically. Phased arrays allow the designer to achieve resolutions such that images formed are similar to those formed with optical cameras. Therefore, high resolution image formation with a phased array has been dubbed by persons having ordinary skill in the art as the "radio camera". The aperture of a "radio camera" is a highly thinned array in which the individual elements are separated from one another and distributed over an area which can be as large as 1,000 square kilometers, or larger if the wavelengths increase.

Since the elements of a radio camera are distributed over such a large area, the design must circumvent the requirement that the array surface be planar or otherwise have a fixed spatial orientation. The system design must be sufficiently robust to permit the coordinates of each individual element to be arbitrarily chosen and even possibly to vary in time. Since the scattered images from a target will reach each element of the array at different times it becomes necessary to design a low order intelligence into the system which will allow beam forming and scanning to proceed in the absence of accurate knowledge of each element's position as a function of time. A low order intelligence produces the property of self-coherence sometimes called self-phase, or self focus. This method of self-coherence is known to those of ordinary skill in the art as Adaptive Beam Forming (ABF). See Steinberg, *Microwave Imaging With Large Antenna Arrays*, pp 135–138, John Wiley & Sons (1983).

In conventional systems such as ordinary optical, microwave or RADAR systems, self-coherence is inherent. That is, the conventional telescope mirror or microwave dish has an accurately shaped reflecting surface that focuses energy to a point. The surface is shaped so that rays that leave a distant source simultaneously arrive at the surface and are reflected to a common point called the focus or focal point. The shaped mirror or dish equalizes the travel times of all rays from source to surface to focal point. Lenses accomplish the same result by varying their thicknesses with position, differentially, so that light rays passing through them are provided with a single focal point.

Because a phased array is spatially distributed, it cannot depend on a surface shape to time align the signal passing through it. Instead, a phased array must have electrical circuits to delay the signal differentially from the different parts of the array so that simultaneity is achieved. Persons of ordinary skill in the art are well aware of techniques to achieve this electrical phase alignment known as Adaptive Beam Forming.

The radio camera only functions effectively in receiving signals from scattered targets. The adaptive beam forming technique with a radio camera allows high resolution images from scattered radiation to be produced. However, there is still a long felt need in the art for systems that can identify unknown airborne targets by first illuminating the target with, for example radiation from the ground to be scattered back toward a phased array. Such a system has not yet been achieved so as to produce satisfactory images adequate for high resolution target identification.

Synthetic Aperture Radar (SAR) has been known in the art since the middle 1950's. See Steinberg, *Microwave Imaging With Large Antenna Arrays* at p. 11. As evidenced by its name, the aperture in SAR is not the standard aperture understood by the RADAR art. SAR is created by putting a transmitter on a moveable object such as an airplane and allowing the airplane to travel a distance L equal to its velocity multiplied by the time. As the airplane travels a distance, L, an on-board RADAR transmitter pulses at some extremely short time interval. The effective aperture size is the velocity V the airplane travels over the time period T rather than the small fixed mechanical aperture size of the RADAR itself. L is the synthetic aperture. This creates a larger aperture than the mechanical aperture of the transmitter. Therefore, the wavelength-to-aperture ratio, which defines the effective resolution of the system is dramatically decreased by the larger aperture size.

SAR, in a non-accelerating airplane, transmits a sequence of pulses at equal intervals and receives their echoes from equally spaced positions along the aircraft's flight path. By combining the received signals coherently, the system synthesizes the equivalent of a large antennae array given that the aircraft speed is V, the period between pulses is T and the number of coherently integrated pulses is N. The distance the aircraft flies during this time interval is L=NTV which is the length of the synthetic aperture. However, deviations from non-accelerating flight, due for example to wind gusts, distort the synthetic aperture and require correction. This has been done with measurements made within the airplane with pendulums, accelerometers or other inertial devices that note the instantaneous acceleration of the platform from which the instantaneous deflection from straight line flight can be calculated. These measurements lead to phase corrections made in the receiver local oscillator or in the resulting data set to compensate for the aperture distortions. This requires that the aircraft housing the synthetic aperture RADAR is "cooperative" so that acceleration errors can be transmitted to ground stations to correct for the phase distortions. SAR is a viable system for this reason since phase and amplitude correction data is readily available from cooperative aircraft which function as the transmitter platform for the SAR.

Real world applications of RADAR require identification of airborne targets which are unknown and possibly hostile. A ground-based transmitter set, or one set in an airborne platform having positional compensation devices, is required to achieve this purpose. High resolution images are an absolute requirement for this system in order to efficiently facilitate target imaging and identification. In the SAR system, the transmitter is located on board the airborne platform which images motionless ground target. Generally, the SAR system is inadequate to perform target imaging and identification of hostile airborne targets. Therefore, a system, preferably ground-based, which can produce a highly resolved image of an accelerating airborne target is desired. Such a system has not heretofore been developed to satisfy this need.

There is a long-felt need for target imaging and identification of airborne targets from, preferably, ground-based systems. Inverse synthetic aperture RADAR (ISAR) has been known for many years to those with ordinary skill in the art as a method for target imaging and identification of airborne targets. In ISAR it is necessary to achieve a large aperture size, as with SAR, in order to achieve the resolution desired. In ISAR, a moving target is illuminated as it travels a distance L over a time T by a the ISAR system. In a preferred embodiment of the ISAR system, the RADAR is on the ground and illuminates a flying target. Therefore, the target's motion is used to synthesize an extended aperture which can then image the target. The successive directions of arrival of the pulses from the reflected radiation are generally line of sight vectors from the target to the receiving set. From the frame of reference of the airborne target the apparent sources of these radiated pulses come from a succession of nearly equally space positions on the ground. This set of positions forms a synthetic aperture. The length of the aperture is as in SAR, L=NTV.

Although the principal of ISAR is thirty years old, ISAR is intrinsically more difficult to implement than SAR because the RADAR and the airborne platform are not co-located. Co-located RADAR sets are RADARs in which the transmitter is contained within the moving platform. As a consequence, the ISAR system has no means for obtaining the mechanical measurements of instantaneous target aircraft acceleration for correction of the RADAR data. The hostile airborne target is buffeted by winds, may have internal acceleration changes and is also flexed and distorted by its travel through the air at high speeds. These changes in acceleration are not measurable on a hostile aircraft and therefore cannot be transmitted to the ISAR ground station for phase correction. Therefore, while ISAR is a concept which has been known for many years, it has been virtually impossible to obtain a highly resolved target image using ISAR because of the acceleration errors which produce phase distortions that are intolerable to high resolution images.

There has been a long felt need in the RADAR art for high resolution images for identification of airborne targets. No system exists today which fulfills this long felt need since phase and amplitude errors which are not correctable within a ground RADAR transmitter/receiver set exist in virtually all airborne targets. No single RADAR imaging system has been known heretofore capable of producing highly resolved images which are adaptable for imaging and identification of airborne targets. Many others have attempted to solve this problem but have failed.

OBJECTS OF THE INVENTION

It is an object of this invention to provide a method for target imaging and identification.

It is another object of this invention to provide means for identifying moving, especially airborne targets with high resolution.

It is yet another object of this invention to provide an inverse synthetic aperture RADAR system capable of producing high resolution images of targets.

It is still another object of this invention to provide inverse synthetic aperture RADAR system with adaptive beam forming capability in order to produce phase corrected and highly resolved images for target imaging and identification. These and other objects are realized through the employment of one or more of the preferred embodiments of the present invention.

SUMMARY OF THE INVENTION

In accordance with this invention, ABF is coupled with ISAR for correction of aperture distortion due to flight path perturbation. Thus ABF, which is a closed loop electrical self-calibration procedure, can replace open loop electro-mechanical devices currently in use.

A preferred embodiment of this invention utilizes the basic radio camera, which is a highly thinned distorted aperture that is self-calibrated, dynamically by the ABF procedure. This creates a huge receiver aperture suitable for high resolution imaging. Generally, the size of the aperture is from ten to several hundreds or thousands of wavelengths. By way of comparison with optical imaging instruments, a camera lens stopped down for bright sunlight is $10^4$ wavelengths in diameter. The objective of a two inch optical telescope is $10^5$ wave lengths. The cost of an antennae array proportionately as large is prohibitive unless it can be extraordinarily thinned. The term "thinned" is known by those with ordinary skill in the art to mean a distributed phased array wherein the elements are distributed over a large area.

When utilizing a thin periodic aperture, the grading lobe electromagnetic distortion typically limits the thinning factor to one to two orders of magnitude. Thus, a linear periodic aperture of $10^5$ wavelengths would require on the order of $10^3$ antennae elements and receivers. This is not a practical number. Two dimensional apertures of this size would require approximately $10^6$ receiving channels which is excessively costly. In a random array however, the number of antennae elements required to maintain a given side lobe level grows only a the logarithm of the aperture size and therefore the size is less of a consideration in determining the cost of the electronics. In a preferred embodiment of the present invention, a phased array with non-colinear elements is utilized.

Furthermore, provided that the targets to be imaged are airborne targets, the unreasonably large number of elements can be reduced by taking advantage of temporal or ISAR processing in each receiver. The temporal processing of a data sequence at each element forms a synthetic aperture associated with that antennae. Each of the synthetic apertures plays the role of a sub-array in this giant array. By utilizing ABF, compensation for synthetic aperture distortion due to flight path perturbation is preferably attained. Furthermore, ABF with an ISAR system simultaneously phase-synchronizes all the synthetic sub-apertures which form the giant system. Thus, a combination in preferred embodiments of ISAR and ABF techniques solves the high cost problem of the spatial radio camera.

In a preferred embodiment, a microwave or short-wavelength transmitter illuminates a target travelling a distance L over a time T. Preferably, the backscattered radiation from the target, falls on a distributed phased array wherein the elements of the array may be randomly placed or non-colinear. In a preferred embodiment, the backscattered radiation falls on the elements of the array with great phase differences. In this way a range against phase element matrix is built up for the phased array. In preferred embodiments, radiation scattered from efficient scattering surfaces of the target is primarily utilized in the establishment of this matrix.

To utilize the ABF technique in preferred embodiments with the ISAR technique, the Range-Element matrix is sampled such that a particular column in the matrix which corresponds to a reflecting portion of the target of relatively constant amplitude is selected. A constant amplitude row normally exists since the radiation scattered from a sharp angular portion or highly reflective surface on the target will essentially be composed of spherical waves. A spherical wave is defined as having a constant phase and constant amplitude at a particular wave-front.

In preferred embodiments, the information from the column which has been selected for its' constant amplitude is input into an adaptive processor and processed by an ABF algorithm. The ABF algorithm is well known to those with ordinary skill in the art and can be readily examined in Steinberg, *Microwave Imaging with Large Antenna Arrays*, pp. 135–138 herein incorporated by reference. In preferred embodiments, many images of the airborne target are taken such that the additional images are overlaid in a feedback loop or averaged to build up a superior, highly resolved signal. This is called diversity combining and is well known to persons with ordinary skill in the art especially in the field of digital data communications. Thus, by combining ABF with ISAR a highly resolved signal is readily available which has many uses including, but not limited to, imaging and identification of unknown airborne targets.

DETAILED DESCRIPTION OF PREFERRED EMBODIMENTS

Figure 1:
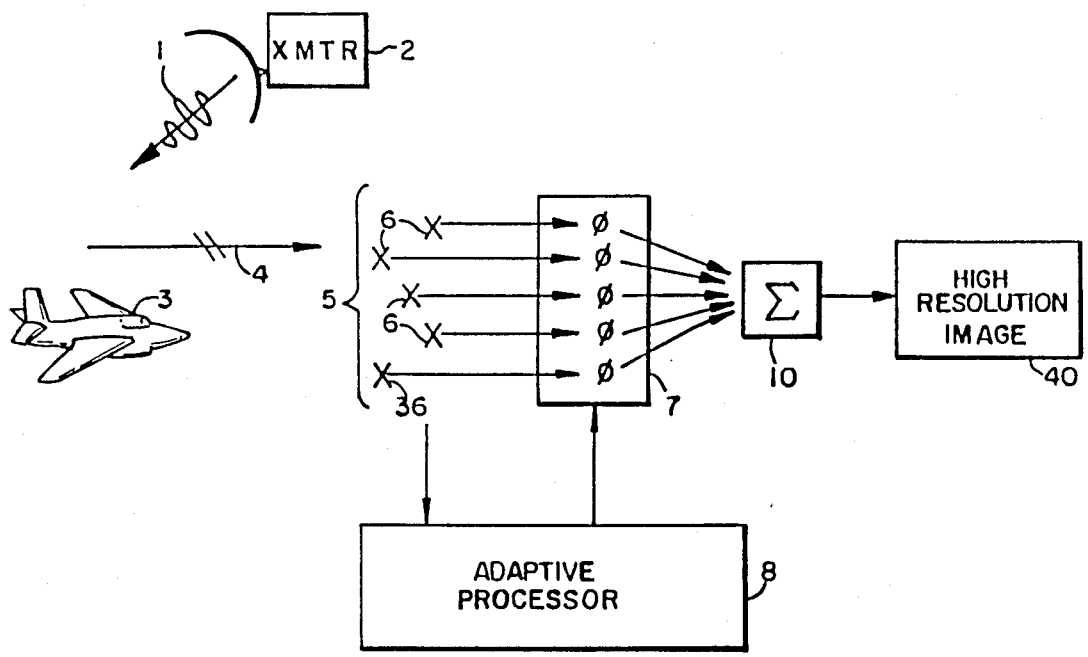
FIG. 1 is a block diagram illustrating the Adaptive Beam Forming technique.

Referring to FIG. 1 a block diagram of a phased array which utilizes adaptive beam forming is shown. An electromagnetic signal 1 is output from transmitter 2 and illuminates target 3 which is at a certain distance. Backscattered radiation 4 is reflected from the target 3 to the distributed phased array 5. The elements 6 of the phased array 5 are randomly distributed over an area and comprises generally N elements. The phased array 5 measures the phase and amplitude information of echo 4 as a function of range. Imaging from the beam forming source 3 occurs at each element 6. The ranges are broken down into i range bins. A bank of phase shifters 7 which are in 1 to 1 correspondence with the elements 6 of the array 5 receives signals from each of the elements 6 of the array 5. Phase shifters 7 conjugate all the phases of the signals falling on element 6.

Conjugation of phases is the Adaptive Beam Forming step. The phases, $\psi_{in}$, as measured at phase shifters 7 is broken up into the sum of two terms;

$$\psi_{in} = \psi'_{in} + \psi''_{in} \tag{1}$$

The first term in equation (1), $\psi'_{in}$, contains conventional target and array information and is all that would be expected in the absence of array distortion, medium turbulence, multi-paths, and scattering. The second term in equation (2), $\psi''_{in}$, represents the errors in phase synchronization which must be overcome. As in any phased array, the phase weighting is the conjugate of the kernel of the diffraction integral. The diffraction integral can be approximated, as known by persons with ordinary skill in the art, by the Fresnel or Fourier integral.

Adaptive processor 8 is provided to compensate for the phase errors that are introduced as a result of distortion, turbulence, multipath and scattering etc. The phases of echo 4 are disparate because of the perturbed geometry of the array, spatial variations of the refractive index, the impedience variation from element to element or any combination of these factors. Adaptive Processor 8 compensates for the phase variations by phase rotating the complex wave-form envelopes of echoes 4 received by array elements 6 and co-phasing them. Co-phasing is the step of electrically rotating the phase of each of the elements 6 to align them with reference element 36. Correction of phase, or conjugation, is accomplished by phased array 5 when it focuses on reference element 36. Reference element 36 is an arbitrary element of the phased array 5.

Initially, the echoes 4 fall on the elements 6 of the phased array. The echoes are complex wave-form envelopes which can be represented generally as:

$$V_{in} \exp j\psi_{in} \tag{2}$$

which is the complex wave-form envelope of the echo from the $i^{th}$ range bin as received by the $n^{th}$ element. When the amplitude $V_{in}$ is normalized the above complex envelope assumes the form:

$$A_{in} \exp j\psi_{in} \tag{3}$$

Figure 2:
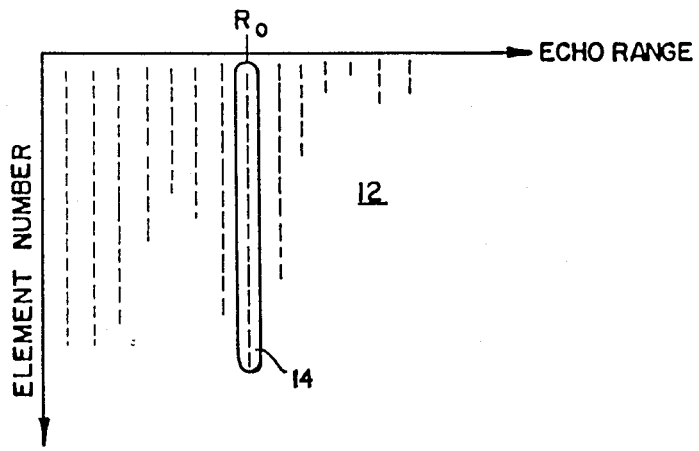
FIG. 2 is an illustration of the range-element matrix utilizing the Adaptive Beam Forming technique.

In the ABF method, the phased array gathers echoes from target 3 such that matrix 12 of FIG. 2 is constructed as shown. Matrix 12 is the range versus element matrix. Matrix 12 represents the amplitudes of echoes 4 which are reflected from the efficient and highly reflective surfaces of target 3 as a function of the echo range. Before the Adaptive Beam Forming technique can be performed it is necessary for Adaptive Processor 8 to determine a range $R_0$, shown generally at 14, in which the amplitudes of the echoes are relatively constant. $R_0$ is the range at which the phase and amplitude of the complex wave-form envelopes is constant. That is, the wave front emanating from a highly reflective portion of the target is essentially spherical. When $R_0$ is found, the amplitude is essentially constant for all range bins, i.e:

$$A_{on} \approx A, \text{ for all } n. \tag*{}$$

Therefore, the complex wave envelope follows the form:

$$A\exp(j\psi_{on}). \tag{4}$$

Phase conjugation is then performed on $R_0$ with respect to reference element 36. Phase conjugation is accomplished with respect to the reference element since the reference element is of the form $\exp_j(\psi_{oo}-\psi_{on})$. Therefore, $R_0$ is phase rotated by the conjugation of the reference element and $R_0$ such that the conjugation has the form:

$$A\exp_j\psi_{oo} \tag{5}$$

Once this step is accomplished all the remaining elements which have developed complex wave-form envelopes based on range are re-focused with respect to $R_0$. This process is repeated for each of the random elements 6 in phased array 5 which yields a set of phase rotated complex wave-form elements of the form:

$$A_{in}\exp_j(\psi_{in}-\psi_{on}+\psi_{oo}) \tag{6}$$

It is then necessary to focus the elements 6 of phased array 5 at all ranges simultaneously. This is accomplished for an arbitrary range $R_i$ by refocusing the phased array from reference range $R_0$ to $R_i$. The phase correction is approximately quadratic and takes the form:

$$B_{in}=A_{in}\exp_j[\psi_{in}-\psi_{on}+\psi_{oo}+(KX^2_n/2)(1/R_i-1/R_o)] \tag{7}$$

This is a single term of the Fresnel integral which is best represented by a sum over n when the target is in the far field.

The self-cohering process forces the quadratic component of the phase shift of the signal in the $n^{th}$ channel to become:

$$-KX^2_n/2R_i+KX^2_n/2R_o \tag{8}$$

wherein $X^2_n/2R_o$ is the differential distance between the spherical phase front and a datum line tangent to the reference element in the phased array and functions as a correction to the phase shift when the target is in the near field. $KX^2_n/2R_i$ is the distance from the datum line to the $R_i^{th}$ range.

To focus phased array 5 to range $R_i$, equation 7 must be set to zero which requires the addition of the term:

$$(KX^2_n/2)(1/R_i-1/R_o) \tag{9}$$

therefore yielding equation (8).

Finally, adaptive processor 8 imparts a linear phase rotation to the range focused complex wave-form envelope. The adaptive processor imparts a linear phase shift $-KX_nU$ to the range focused complex wave-form envelope wherein $X_n$ is the distance from the reference element datum line to the target and U is the scan angle from the normal line to the array. This yields an equation of the form:

$$B_{in}\exp(-jKX_nU) \tag{10}$$

Summer 10 then sums all of the re-focused complex envelopes over n and outputs a highly resolved signal 40. This yields the summation:

$$S_i(u) = \sum_{n=1}^{N} B_{in} \exp jKX_nU \tag{11}$$

wherein N is the total number of array elements in the phased array. Thus, the ABF process yields a highly resolved signal appropriate for target imaging and identification.

Figure 3A:
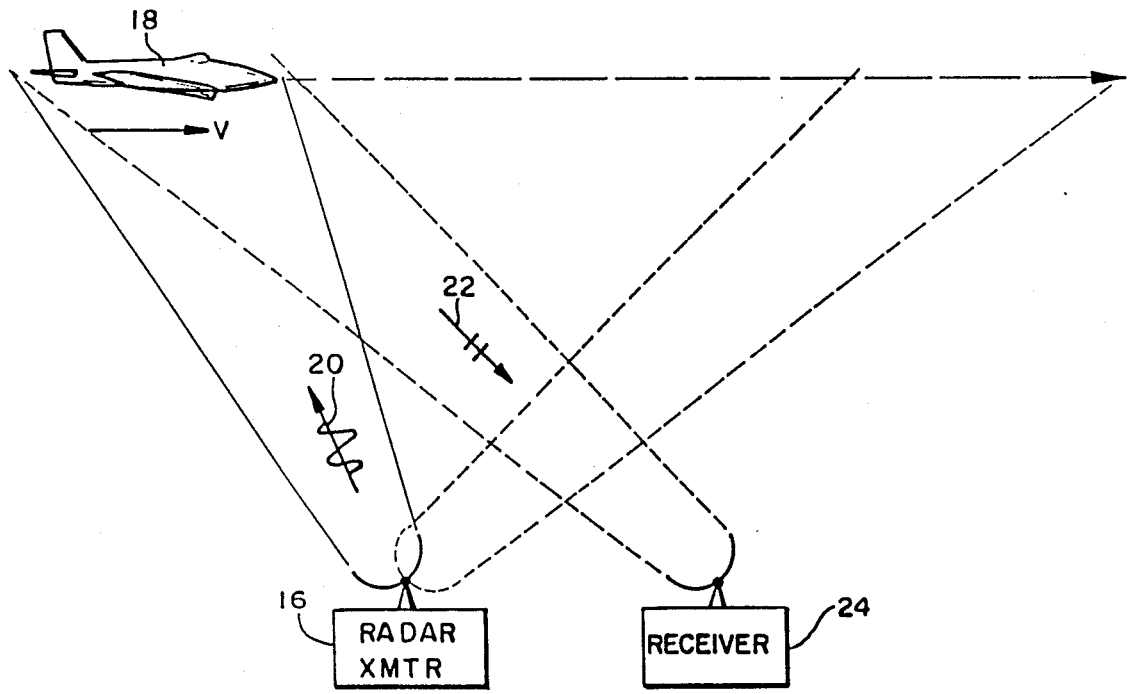
FIG. 3A is an illustration of conventional RADAR techniques.
Figure 3B:
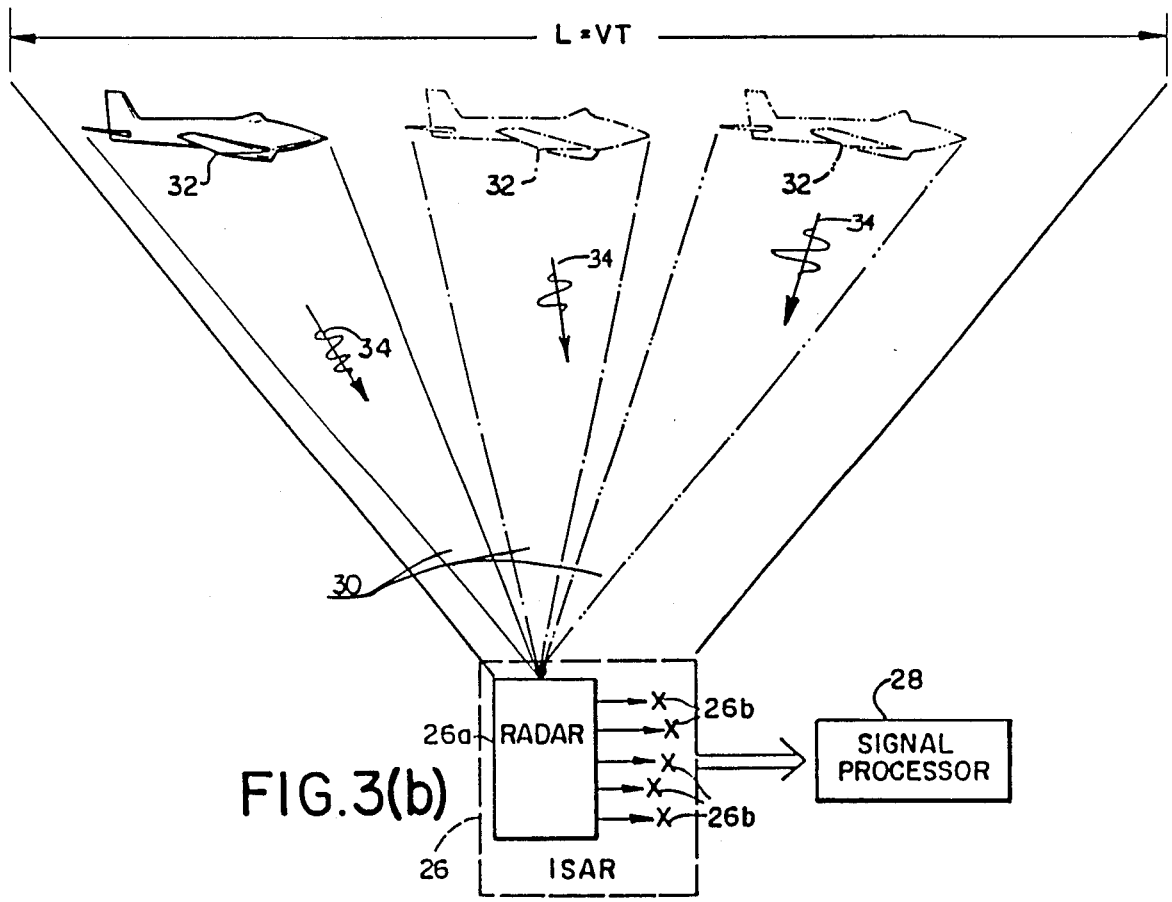
FIG. 3B is an illustration of a preferred embodiment of the ISAR technique.

FIGS. 3A and 3B represent Inverse Synthetic Aperture Radar (ISAR) operation. Referring to FIG. 3A, transmitter 16 illuminates target 18 which is preferably a moving, airborne target. Target 18 is illuminated with electromagnetic radiation 20 preferably in the microwave regime. Backscattered signals 22 from target 18, are received at receiver 24. In conventional RADAR systems, the aperture size of transmitter 16 is too small to produce highly resolved images at receiver 24. Therefore, inverse synthetic aperture RADAR (ISAR) was proposed to produce large enough aperture sizes so that the resolution is to within a few radians.

Referring to FIG. 3B, ISAR system 26 is comprised of a conventional RADAR transmitter 26a and a phased array receiver 26b with random, non-colinear elements. The ISAR system 26 pulses electromagnetic radiation 30 at a high frequency. Target 32 travels a distance L which is equal to its velocity over a time period T. In this manner, backscattered radiation 34 is received by phased array 26b over the length L as the ISAR transmitter 26a pulses.

The backscattered radiation 34 is received at the ISAR receiver set 26b, and is input to a signal processor 28 for processing of the data. In general, the signal processing of signal processor 28 is inadequate to compensate for the real world acceleration phase changes and errors introduced into the system such that high resolution of an image of target 32 is impossible with ISAR alone. Therefore, an ISAR system cannot by itself produce highly resolved images necessary for target imaging and identification.

Figure 4:
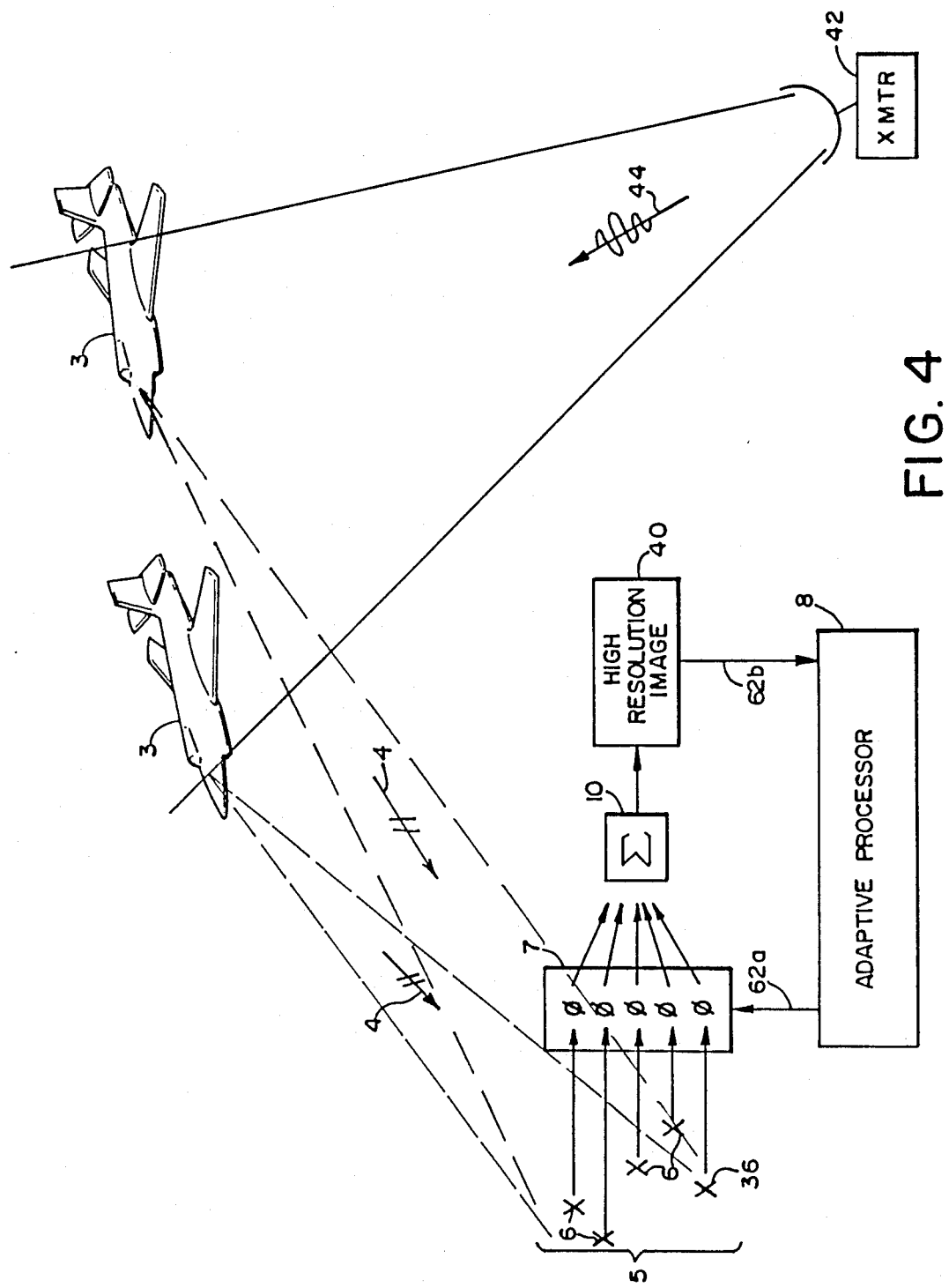
FIG. 4 is an illustration of a preferred embodiment of a combined ISAR and ABF system.

FIG. 4 represents, in a preferred embodiment, the solution to the above referenced problem. In FIG. 4, the ISAR system is combined with the Adaptive Beam Forming Process to give a high resolution image of a moving airborne target suitable for target imaging and identification. RADAR transmitter 42 emits a transmitted signal 44 which falls on airborne target 3. Echo 4 from airborne target 3 falls on the distributed phased array 5 with random elements 6. The Adaptive Beam Forming process is then performed through phase shifters 7 and summer 10 to produce a high resolution signal 40. As with a normal phased array, adaptive signal processor 8 is employed in feedback loop 62(a) and 62(b) with phase shifters 7 such that image 40 is highly resolved and improved.

A novel method of imaging and identifying moving targets has been described. This novel method comprises illuminating the moving targets with an inverse synthetic aperture RADAR system. The ISAR system requires energizing a RADAR transmitter and irradiating the moving target which is traveling with a certain velocity V over a time period T with a plurality of pulses from the RADAR transmitter set.

Backscattered echoes from the target are received with a phased array receiver with a phased array antenna and the adaptive beam forming technique is performed on these received echoes. The adaptive beam forming technique is accomplished by measuring and storing complex wave-form envelopes of the echoes then searching the complex wave-form envelopes for an envelope of constant phase and amplitude. Then, the constant phase and amplitude complex wave-form is phase rotated with respect to a reference element of the phased array.

The remaining complex wave-form envelopes are then phase rotated with respect to the constant phase and amplitude envelope whereupon a linear phase rotation is imparted to all the phase rotated complex wave-form envelopes. The ABF method then sums all the linear phase rotated complex wave-form elements while the phased array scans for additional backscattered echoes. A feedback loop is employed which performs successive iterations of the aforementioned process and forms a highly resolved image. In a preferred embodiment, this image may then be output onto a display.

The ISAR system coupled with Adaptive Beam Forming in fulfills a long felt need in the RADAR art for highly resolved images of accelerating targets such that accurate imaging and identification is attained. Thus, a target imaging and identification system for high resolution of accelerating targets has herein been described. While preferred embodiments of the invention have been illustrated above, it will be recognized by persons with ordinary skill in the art that various modifications are within the true spirit and scope of the invention. Therefore, the appended claims are intended to cover all such variations and modifications, as will be recognized by persons with ordinary skill in the art.

What is claimed is:

1. A method of imaging and identifying moving targets comprising the steps of:
   (A) illuminating said moving targets with an Inverse Synthetic Aperture RADAR (ISAR) system, the steps of illuminating said moving target with said ISAR comprising:
     (i) energizing a RADAR transmitter;
     (ii) irradiating said moving target travelling with a velocity V for a time T with a plurality of pulses from said RADAR transmitter such that a synthetic aperture is obtained;
   (B) receiving backscattered echoes containing phase information from the target and phase distortion due to target perturbation from said illumination of the target with a phased array receiver means;
   (C) performing Adaptive Beam Forming (ABF) on said echoes to obtain self-coherence after said echoes have been received by said phased array, the steps of ABF comprising:
     (i) measuring and storing complex waveform envelopes of said echoes;
     (ii) searching said complex wave-form envelopes for an envelope of constant phase and amplitude;
     (iii) phase rotating said envelope of constant phase and amplitude in relation to a predetermined reference element of said phased array;
     (iv) focusing said phased array by phase rotating each remaining complex waveform envelope in relation to said envelope of constant phase and amplitude;
     (v) imparting a linear phase rotation to all phase rotated complex wave-form envelopes;
     (vi) summing said linear phase rotated complex wave-form envelopes;
     (vii) allowing said phased array to scan said target for additional backscattered echoes;
     (viii) employing a feedback loop with an adaptive processor to focus all of the complex wave-form envelopes;
     (ix) distinguishing the target's phase information from the target's phase distortion due to target perturbation with the feedback loop having an adaptive processor such that the sum of the linear phase rotated complex wave-form envelopes and the additional backscattered echoes form a highly resolved signal; and
   (D) optically displaying said highly resolved signal.

2. The method of claim 1, wherein said phased array comprises a plurality of co-linear elements.

3. The method of claim 1, wherein said phased array comprises a plurality of non-colinear elements.

4. The method of claim 1, wherein said RADAR transmitter is fixed on the ground.

* * * * *

UNITED STATES PATENT AND TRADEMARK OFFICE
CERTIFICATE OF CORRECTION

PATENT NO.   :   4,855,747
DATED        :   August 8, 1989
INVENTOR(S)  :   Steinberg It is certified that error appears in the above-identified patent and that said Letters Patent is hereby corrected as shown below:

Col. 1, line 15     "an" should be --and--.

Col 3, line 45      "equally" should be --equal--.

Col. 3, line 48     "principal" should be --principle--.

Col. 4, line 62     "a" should be --as--.

Col. 8, line 19     There should be a caret above the "S".

Col. 9, line 35     The word "in" should be deleted.

Signed and Sealed this

First Day of October, 1991

Attest:

HARRY F. MANBECK, JR.

*Attesting Officer*     Commissioner of Patents and Trademarks